(No Model.)
I. COLE.
WOOD SCREW.
No. 288,923. Patented Nov. 20, 1883.
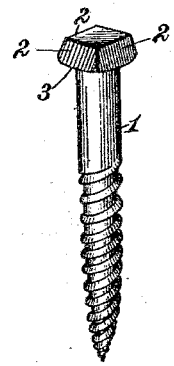
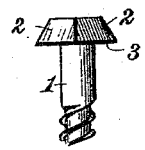
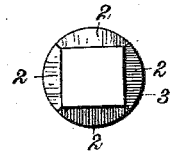
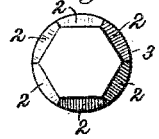
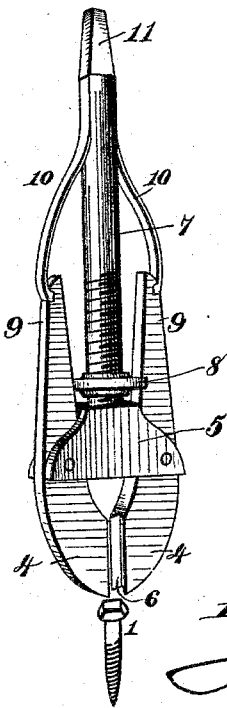
WITNESSES
INVENTOR
Isaac Cole,
By James L. Norris
ATTORNEY

UNITED STATES PATENT OFFICE.

ISAAC COLE, OF NEWARK, NEW JERSEY.

WOOD-SCREW.

SPECIFICATION forming part of Letters Patent No. 288,923, dated November 20, 1883.

Application filed May 1, 1883. (No model.)

*To all whom it may concern:*

Be it known that I, ISAAC COLE, a citizen of the United States, residing at Newark, Essex county, New Jersey, have invented new and useful Improvements in Wood-Screws, of which the following is a specification.

This invention has for its object to provide a wood-screw with a head of novel construction, capable of being driven into position by a tool adapted to grasp the head of the screw, said head being of such form as to avoid injuring fine panel and other polished wood work when screwed into place.

The invention consists of a wood-screw having an angular beveled head, the base of which is circular and flat, said beveled edges extending from the outer end of the head and terminating at the outer edge of the circular base, as will be more fully hereinafter described in detail.

In the accompanying drawings, illustrating the invention, Figure 1 is a perspective view of the improved screw; Fig. 2, a side view of the head, the shank being broken away; Fig. 3, a top view of Figs. 1 and 2; Fig. 4, a top view, showing a modified construction of the screw-head; and Fig. 5, a perspective of the implement for driving and withdrawing the screw.

The screw No. 1 is provided with the usual threads and gimlet-point; but the head of the screw is of novel construction, it being formed with flat beveled sides, 2 and a circular flat base, 3, the apex of the head being thus rendered smaller in diameter than the circular base. A screw having a head thus formed can be driven into position by means of an implement adapted to grasp the head, the beveled sides preventing the implement from sliding along the head and coming into contact with the fine panel-work or polished wood in driving the screw into position. The circular base presents no corners to the wood, and hence will not deface or injure the polished surface of the same, and by the circular base no abraded surface will present itself to the eye after the screw has been driven home. In screws having square heads the corners of the base portion cause an abrasion of the polished surface in the form of a ring when the screw is driven home, which is very objectionable, and is avoided by my construction of circular base, and the sides of the usual square head being parallel, an implement placed thereon to drive the screw will slide or slip along the sides and strike the polished surface, often causing considerable injury, and requiring the work to be repolished where defaced, which objection I avoid by beveled sides of the angular head, whereby the apex of the latter is rendered smaller than its base, thus preventing the implement from sliding inward toward the base of the head.

In Figs. 1 and 3 the angular head is shown as provided with four flat beveled sides, while in Fig. 4 the head is hexagonal in cross-section, having six beveled sides, 2, merging into the circular flat base 3; but the angular form of the head may be varied as desired, so long as the sides are beveled and merge into a flat circular base.

The implement which I have devised for driving the screws, as shown in Fig. 5, consists of two jaws, 4 4, pivoted to a stock, 5, and having angular recesses 6, said stock being rigidly secured to a screw-threaded shank, 7, carrying an adjustable screw-nut, 8, located between the tail ends of the jaws, and by its adjustment on the shank permitting the jaws 4 to be adjusted toward and from each other to accommodate varying-sized screw-heads. The shank is provided with suitable springs, 10, arranged to bear on the tail ends of the jaws, with a tendency to throw the latter apart, which is limited by the position of the screw-nut on the shank. The outer end of the shank is provided with a beveled angular end, 11, adapted to enter the socket of a brace, whereby the implement can be operated to drive the screw.

The screws constructed in accordance with this invention are especially intended for use in coach-making where fine polished wood is to be secured, and in this connection the particular construction of the head is of considerable importance.

I am aware that a bed-screw has been provided with a square head, from the base of which projects a lateral circular flange, and such, therefore, I do not claim. In my invention the sides of the head are beveled, and extend from the outer end of the head to the outer edge of the circular base, whereby when the screw is applied to a carriage a person's hand can move over the screw-head without liability of being cut.

Having thus described my invention, what I claim is—

As an improved article of manufacture, a wood-screw having an angular head constructed with beveled sides 2 and a circular flat base, 3, said beveled sides extending from the outer end of the head and terminating at the outer edge of the circular base, substantially as shown and described.

In testimony whereof I have hereunto set my hand in the presence of two subscribing witnesses.

ISAAC COLE.

Witnesses:
JAMES L. NORRIS,
J. A. RUTHERFORD.